United States Patent [19]

Endress

[11] Patent Number: 5,726,715
[45] Date of Patent: Mar. 10, 1998

[54] METHOD AND APPARATUS FOR DISPLAYING TWO VIDEO PICTURES SIMULTANEOUSLY

[75] Inventor: Wolfgang Endress, Winnenden, Germany

[73] Assignee: Sony-Wega Produktions GmbH, Fellbach, Germany

[21] Appl. No.: 571,206

[22] Filed: Dec. 12, 1995

[30] Foreign Application Priority Data

Dec. 12, 1994 [EP] European Pat. Off. ............... 94119596

[51] Int. Cl.[6] ......................................................... H04N 5/45
[52] U.S. Cl. .......................... 348/565; 348/566; 348/567
[58] Field of Search ................................... 348/563, 564, 348/565, 566, 567, 584, 586, 588, 598, 599; H04N 5/445, 5/45, 9/74, 9/76

[56] References Cited

U.S. PATENT DOCUMENTS 5,299,007   3/1994   Saeger ........................................ 348/563

FOREIGN PATENT DOCUMENTS 61-193580   8/1986   Japan.
61-208981   9/1986   Japan.
62-47280    2/1987   Japan.

Primary Examiner—Sherrie Hsia
Attorney, Agent, or Firm—William S. Frommer; Alvin Sinderbrand

[57] ABSTRACT

A method and an apparatus for simultaneously displaying two independent video signals are described. The apparatus comprises video signal input terminals (2, 6) for receiving first and second video signals in PAL system having the field frequency of 50 Hz, Y/C processors (7, 8) connected to the video signal input terminals (2, 6), A/D converters 16, 24) connected to the Y/C processors two port field memories 17, 22) having a random block addressing mode for storing the digital Y/U/V signals from the A/D converters, a D/A converter (19) connected to an output of the field memories 17, 22) and deriving analog Y/U/V signals which are converted to R/G/B signals and supplied to a display (10), a write and read control signal generator (14; 20, 21) for generating first and second write control signals so that the first and second digital Y/U/Y signals are written into the first and second field memories (17, 22) at a first predetermined frequency in synchronisms with the synchronizing signals of the first and second video signals, respectively, and for generating first and second read control signals so that the first and second digital Y/U/V signals are alternately linewise read-out from the first and second field memories 17, 22) at four times the first predetermined frequency in synchronism with a master synchronizing signal of either the first or second video signals and which are displayed each in an aspect ratio of 4:3 or 3:3 on the screen having a wide aspect ratio of 16:9 in a 100 Hz flickerless mode.

11 Claims, 7 Drawing Sheets

METHOD AND APPARATUS FOR DISPLAYING TWO VIDEO PICTURES SIMULTANEOUSLY

BACKGROUND OF THE INVENTION

1. Field of the Invention

The invention relates to a television receiver displaying two pictures on its screen simultaneously.

2. Description of the Related Art

It is well known to display two pictures, one as the main picture and the other as a sub-picture within the main picture, simultaneously on the screen of a television receiver by using a memory for the sub-picture. This feature is called as "picture in picture". However, since the sub-picture is displayed in a small size, the picture quality is not sufficient to show details of the picture. Therefore, it has been proposed to display two pictures in a same size simultaneously on the screen by using line memories, as known in Japanese laid open patent publications Nos. 61-193580, 61-208981 and 62-47280. However, such a double picture display by using line memories can be realized only if two video signals for the two pictures are synchronized with each other.

On the other hand, it is also known to display a flickerless picture in a double of the normal field frequency by using a field memory. Hence, it has been considered to display two pictures in a same size simultaneously on the screen by using field memories.

SUMMARY OF THE INVENTION

It is therefore an object of the present invention to provide a method and an apparatus for displaying the pictures of two independent video signals on the screen of a television receiver with substantially the same size. In accordance with the foregoing objectives, the present invention provides method and apparatus for displaying video pictures of a first and a second video signal. The first video signal is stored in a first memory at a first predetermined frequency in synchronism with a synchronizing signal and a second video signal is stored in a second memory at the first predetermined frequency in synchronism with a synchronizing signal. The first and second video signals are read out from the first and second memories alternately linewise at a second predetermined frequency in synchronism with a master synchronizing signal. The corresponding video picture of the first and second video signals are then displayed on a video screen.

With the video display method according to the invention it is possible to display the pictures of two independent video signals with approximately the same size.

A television receiver according to the invention can display two pictures simultaneously on its screen in a same size or similar sizes.

BRIEF DESCRIPTION OF THE DRAWINGS

The invention will now be described by way of examples and with reference to the accompanying drawings in which.

DESCRIPTION OF THE PREFERRED EMBODIMENTS

Figure 1:
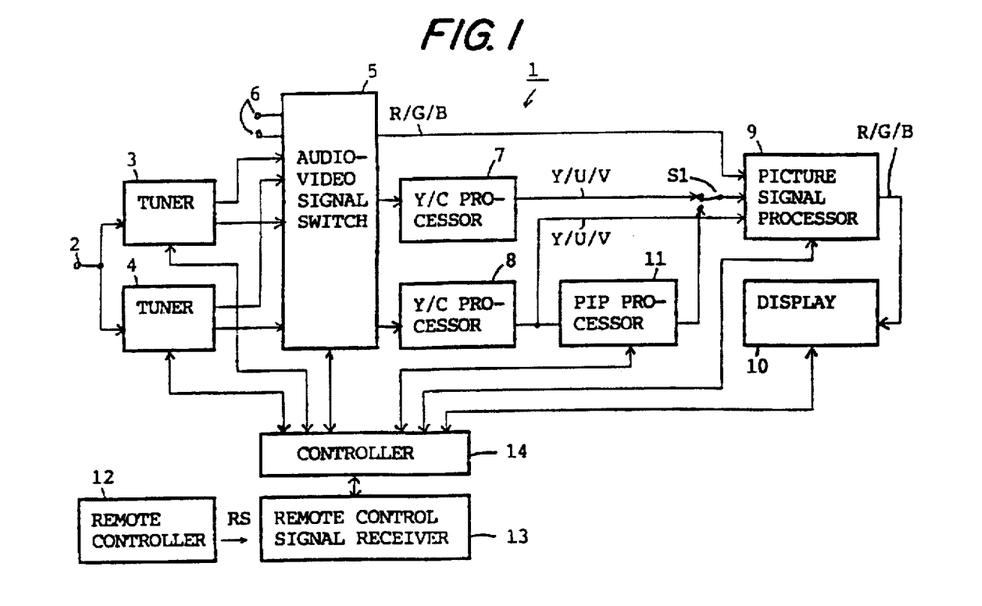
FIG. 1 is a schematic block diagram showing an example of a television receiver in accordance with the invention.

Referring to FIG. 1, the construction of the television receiver 1 is now explained. The television receiver 1 has an antenna input 2, which is connected to one or more tuners 3 and 4 each including a video IF signal demodulator and an audio signal demodulator so that one or more composite video signals and accompanying audio signals are obtained, respectively. The tuners 3 and 4 are connected to the audio and video signal switcher (hereinafter, AV switcher) 5 and provide the latter with the composite video signals and audio signals. Auxiliary audio and video signal inputs (hereinafter, AV input) 6 are also provided for selection by the AV switcher 5. Therefore, the AV switcher 5 supplies the following circuits with two composite video signals and accompanying audio signals selected among those input signals. One or more audio signals selected by the AV switcher 5 are supplied to a sound signal processor, though not illustrated. The audio signal is irrelevant to the invention and its explanation is omitted.

Two composite video signals selected by the AV switcher 5 are supplied to the luminance and chrominance signal processors (hereinafter, Y/C processor) 7 and 8, respectively, in which the respective composite video signals are converted to respective luminance signals Y and color difference signals U and V (as a set of these signals Y, U and V, hereinafter, Y/U/V signals). A composite video signal which is selected by the AV switcher 5 to be displayed as a single picture in normal display mode or the main picture in picture-in-picture (hereinafter PIP) mode is supplied through the Y/C processor 7 and a fast switch S1 to the picture processor 9, in which the Y/U/V signals are subjected to necessary signal process and desired adjustments of picture quality, and from which the video picture signal in a RGB form is supplied to the display apparatus 10. One of the video signals supplied to the AV input 6 may be R/G/B signals. In this case, the R/G/B signals selected by the AV switcher 5 are directly supplied to the picture signal processor 9 in which a R/G/B to Y/U/V converter is provided, though it is not illustrated.

If the PIP mode is selected, a composite video signal selected by the AV switcher 5 to be displayed as a sub-picture in the PIP mode is supplied through the Y/C processor 8 to the PIP processor 11, in which the video signal is subjected to such a signal process that the picture size is reduced to form the sub-picture. The Y/U/V signals for the main picture and the Y/U/V signals for the sub-picture are selectively supplied through the fast switches S1 under the control of a blanking signal accompanying the Y/U/V signals for the sub-picture to the picture signal processor 9.

Accordingly, the sub-picture can be also displayed in a small size on a certain position within the main picture displayed on the screen simultaneously.

The television receiver 1 is further provided with the remote controller 12 for controlling manipulation thereof. Therefore, the television receiver 1 has a remote control signal receiver 13 for receiving control signals RS from the remote controller 12 which are decoded and supplied to a controller 14 for generally controlling the television receiver 1.

Television signal of the normal PAL system has the frame frequency of 25 Hz, the field frequency of 50 Hz, the effective line number of 575 in one frame, the line frequency of 15.625 kHz, the vertical or field scan speed of 20 ms/field and the line scan speed 64 μs/line. In this embodiment, however, the television receiver 1 can generate and display a flickerless picture at the field frequency of 100 Hz from a television signal of the normal PAL system.

Figure 2:
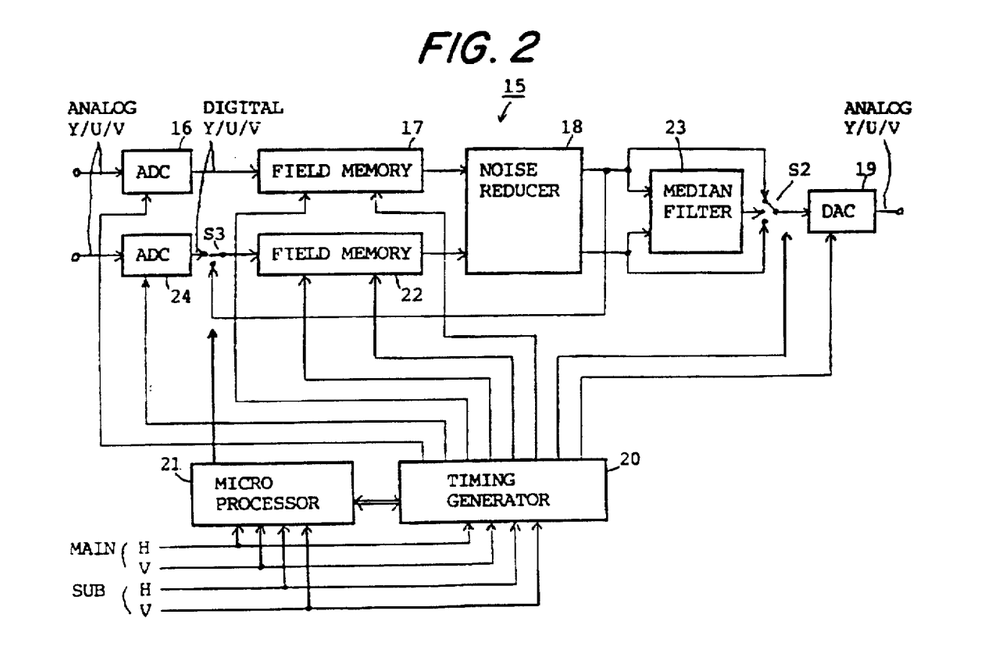
FIG. 2 is an schematic block diagram showing a signal processor for 100 Hz flickerless picture mode and double picture mode in the picture processor of the television receiver shown in FIG. 1.

FIG. 2 shows a schematic block diagram of the signal processor 15 for 100 Hz flickerless picture mode, the main part of which is included in the picture processor 9 in FIG. 1. The signal processor 15 includes the analog to digital converter (hereinafter, ADC) 16, the field memory 17, the noise reduction circuit 18, the digital to analog converter (hereinafter, DAC) 19, the timing generator 20 and the micro processor 21. The last two may be included in the controller 14 in FIG. 1. A noise reduction circuit 18 is irrelevant to the invention and its explanation will be omitted.

Analog Y/U/V signals having the field frequency of 50 Hz from the Y/C processor 7 are supplied to the ADC 16 to be converted into corresponding digital Y/U/V signals by sampling and digitizing each into 8 bits in accordance with a clock signal of 13.5 MHz for example supplied from the timing generator 20, though as an alternative, 16 MHz for example or other clock frequency may be chosen in accordance with system requirements. In practice, however, the luminance signal Y is digitized into 8 bits at the sampling frequency of 13.5 MHz and the color difference signals U and V are digitized into 8 bits at another sampling frequency of 13.5/4 MHz equal to 3.375 MHz, respectively in consideration of band width ratio of respective signals Y, U and V, 4:1:1. The digital color difference signals U and V are divided into four sets of 2 bits, respectively and combined with the digital luminance signal Y, so that each digital luminance signal Y of 8 bits, each divided 2 bits of the digital color difference signal U and each divided 2 bits of the digital color difference signal V constitute one word of 12 bits. Therefore, the analog Y/U/V signals for each effective line scan duration of 52 μs or more are digitized into around 704 or more words in case of the a clock signal of 13.5 MHz. The number of words are selected preferably as a multiple of four, for example 720 words, from the above reason. The ADC 16 may include three separate analog digital converters for processing the Y/U/V signals separately or one or two analog digital converters for processing the Y/U/V signals in a time sharing manner.

The field memory 17 may be constructed as a dual port field memory operating like FIFO (First In First OUT) serial register. The field memory 17 has, for example, a capacity of 245,760 words and can be written and read data asynchronously under the control of its write and read control signals. More specifically, the field memory 17 has terminals for signals for data input, data output, write control including reset write, input enable, write enable and write clock, and read control including reset read, output enable, read enable and read clock, respectively. After a reset operation for an internal write address pointer by the reset write signal, data provided to the data input terminal can be sequentially written into the storage cells designated by the write address pointer which is incremented in accordance with the write clock signal while the input enable and write enable signals are effective, and after a reset operation for an internal read address pointer by the reset read signal, the stored data can be sequentially read out to the data output terminal from the storage cells designated by the read address pointer which is incremented in accordance with the read clock signal while the output enable and read enable signals are effective.

Figure 3A:
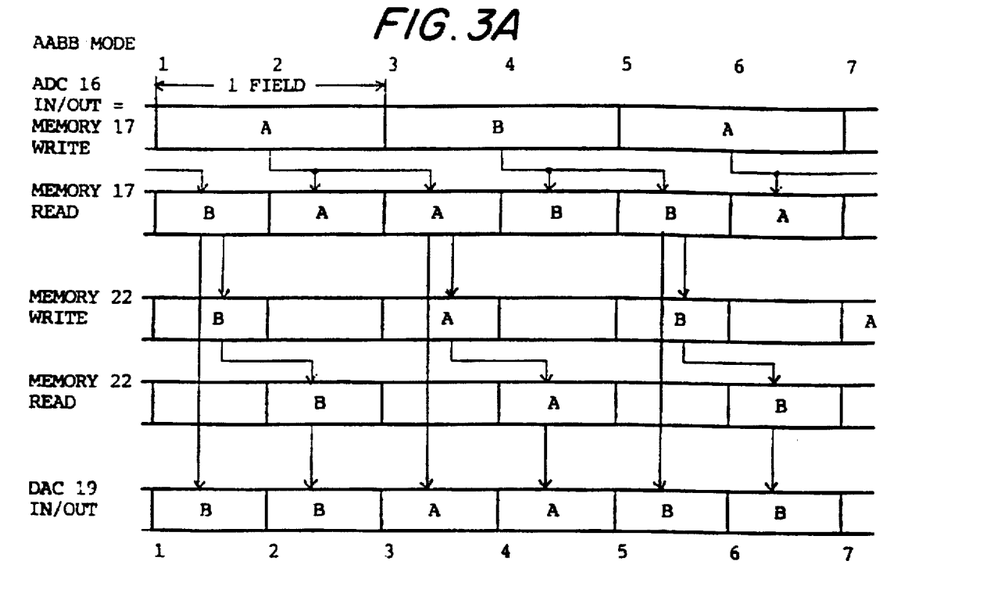
FIGS. 3A and 3B are timing charts of memory control in 100 Hz flickerless picture mode of the signal processor shown in FIG. 2.

The digital Y/U/V signals of each field, for example, around 285 effective lines only which constitute 205,200 words in a case of the sampling frequency of 13.5 MHz are sequentially written into the field memory 17 for each 20 ms, as shown in the first line of FIG. 3A, with the write clock signal having the same frequency of the clock signal of the ADC 16 and supplied from the timing generator 20 and the same Y/U/V signals stored in the field memory 17 are sequentially read out for 10 ms, but twice for 20 ms, as shown in the second line of FIG. 3A, with the read clock signal of 27 MHz, which is a double of the frequency of the write clock signal, supplied from the timing generator 20, so that digital Y/U/V signals having the field frequency of 100 Hz are generated. While the digital Y/U/V signals of each odd field A are read out from the field memory 17 for the second time, simultaneously the digital Y/U/V signal of each even field B are written into the field memory 17 and vice versa as shown in the first and second lines of FIG. 3A.

The digital Y/U/V signals read out from the field memory 17 are supplied through the noise reduction circuit 18 and the switch circuit S2, if provided, to the DAC 19 so as to be converted into analog Y/U/V signals having the field frequency of 100 Hz with a clock signal of 27 MHz, which is the same frequency of the read clock signal of the field memory 17, supplied from the timing generator 20, though its timing chart is not shown in FIG. 3A. The analog Y/U/V signals are then converted to R/G/B signals and fed to the display apparatus 10 which scans horizontally each line at the line scan speed of 32 μs/line among which the effective line scan duration corresponding to the Y/U/V signals from the DAC 19 is 26 μs, the line frequency of 31.25 KHz and vertically each odd field twice for 20 ms and each even field twice for 20 ms at the field frequency of 100 Hz on its screen.

The clock signal for the ADC 16, the write control signals and the read control signals from the field memory 17 and the clock signal for the DAC 19 are generated by the timing generator 20 and the micro processor 21 in synchronism with the horizontal and vertical synchronizing signals of the composite video signal selected by the AV switcher 5 in FIG. 1, which are supplied to the timing generator 20 and the micro processor 21 as shown in FIG. 2. In practice, there may be small circuit delay in each operation, however it will be compensated in the total system.

The above operation creates A, A, B and B sequence of fields. There are other types of sequence of fields, such as A, B, A and B sequence, in which pictures of each odd field A and each even field B are alternately displayed at the field frequency 100 Hz, and A, A*, B* and B sequence, in which a picture of each odd field A, a picture comprised of lines each having a median value of the corresponding line of each even field B and two lines of each odd field A prior to each even field B adjacent to the corresponding line, a picture comprised of lines each having a median value of the corresponding line of each odd field A and two lines of each even field B next to each odd field A adjacent to the corresponding line, and a picture of each even field B are sequentially displayed at the field frequency of 100 Hz for each frame of 25 Hz.

For the above last embodiment, the signal processor 15 further includes, as shown in FIG. 2, the field memory 22 which may have the same construction as the field memory 17, the median filter 23, and the switch circuit S3, if provided.

Similarly to the above example, the digital Y/U/V signals of each odd field A from the ADC 16 are written into the field memory 17 for 20 ms. The same signals are then read out from the field memory 17 for each first 10 ms within one frame of 40 ms according to the read clock signal of 27 MHz and supplied through the noise reduction circuit 18 and the switch circuit S2 to the DAC 19. At the same time, the digital Y/U/V signals of each odd field A read out from the field memory 17 are supplied through the switch circuit S3, if provided, to the field memory 22 and written thereinto. While the digital Y/U/V signals of each odd field A are read from the field memory 17, simultaneously the digital Y/U/V signals of each even field B from the ADC 16 are written into the field memory 17 for 20 ms.

Followingly, the digital Y/U/V signals of each odd field A stored in the field memory 22 and the digital Y/U/V signals of each even field B stored in the field memory 17 are read out simultaneously therefrom for each second 10 ms within one frame of 40 ms and supplied through the noise reduction circuit 18 to the median filter 23, in which digital Y/U/V signals having respective median values between the digital Y/U/V signals of each adjacent two lines of each odd field A and the digital Y/U/V signals of each line of each even field B are produced in the manner as explained above the provided through the switch circuit S2 to the DAC 19.

Subsequently, the digital Y/U/V signals of each even field B stored in the field memory 17 and the digital Y/U/V signal of each odd field A stored in the field memory 22 are read out simultaneously therefrom for each third 10 ms within one frame of 40 ms and supplied through the noise reduction circuit 18 to the median filter 23, in which digital Y/U/V signals having respective median values between the digital Y/U/V signals of each adjacent two lines of each even field B and the digital Y/U/V signals of each line of each odd field A are produced in the manner as explained above and provided through the switch circuit S2 to the DAC 19. At the same time, the digital Y/U/V signals of each even field B read out from the field memory 17 are supplied through the switch circuit S3, if provided, to the field memory 22 and written thereinto. While the digital Y/U/V signals of each even field B are read from the field memory 17 for the second time, simultaneously the digital Y/U/V signals of each odd field A are written into the field memory 17 for 20 ms.

Finally, the digital Y/U/V signals of each even field B stored in the field memory 22 are read out therefrom for each fourth 10 ms within one frame of 40 ms and supplied through the noise reduction circuit 18 and the switch circuit S2 to the DAC 19. The above sequence is repeated every frame of 25 Hz and the switch circuit S2 is so controlled by a switching signal generated by the timing generator 20 and the micro processor 21 that the right digital Y/U/V signals from the field memory 17, the median filter 23 or the field memory 22 can be provided to the DAC 19.

Similarly to the A, A, B and B sequence, the digital Y/U/V signals provided to the DAC 19 are converted into analog Y/U/V signals having the field frequency of 100 Hz with the clock signal and then converted to R/G/B signals which are supplied to the display apparatus 10.

If the A, A, B and B mode is performed by using also the field memory 22, similarly to the memory control in the A, A*, B* and B mode, memory control of the field memories 17 and 22 as shown in FIG. 3A can be used, though its explanation is omitted.

Figure 3B:
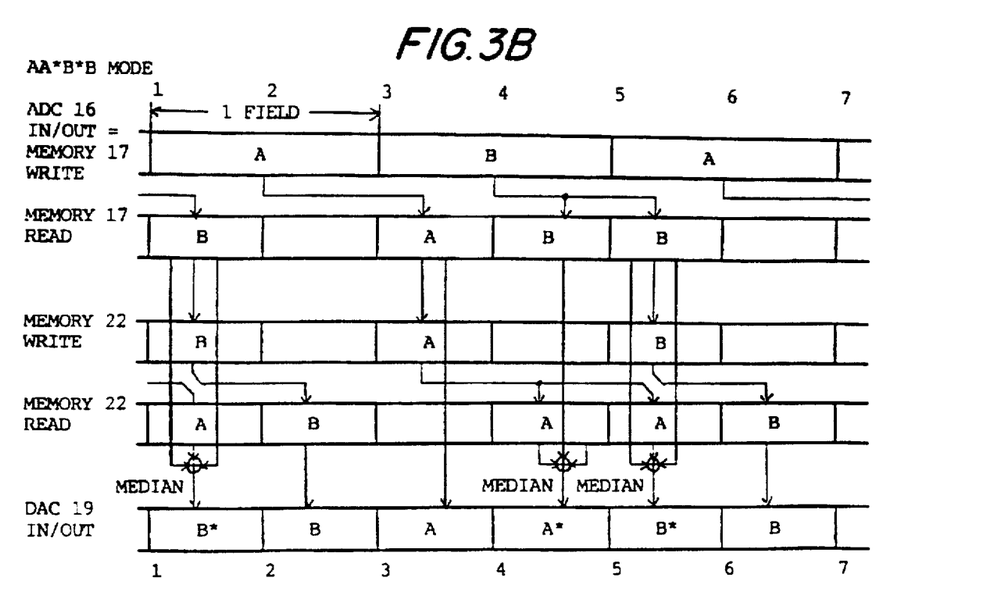

Furthermore, if the A, B, A and B mode is performed, firstly the Y/U/V signals of each odd field A are read out from the field memory 17, secondary the Y/U/V signals of each even field B are read out from the field memory 17, thirdly the Y/U/V signals of each odd field A are read out from the field memory 22, and finally the Y/U/V signals of each even field B are read out from the field memory 22, respectively in FIG. 3B and the respective Y/U/V signals can be sequentially supplied to the DAC 19 as it is. The analog Y/U/V signals from the DAC 19 are then converted to R/G/B signals and supplied to the display apparatus 10 which scans horizontally each line at the line scan speed of 32 µs/line, the line frequency of 31.25 KHz and vertically each odd field for 10 ms and each even field for 10 ms alternately at the field frequency of 100 Hz on its screen.

In the embodiment, double picture mode can be selected from an on screen menu displayed by manipulating certain keys of the remote controller 12 in a predetermined sequence. In the double picture mode, two different motion or still pictures can be simultaneously displayed in one screen. To realize this mode, in the signal processor 15, a further ADC 24 which is the same as or similar to the ADC 16 is connected to the field memory 22 through the switch circuit S3, if provided, as shown in FIG. 2, and supplied with analog Y/U/V signals from the Y/C processor 8 before the PIP processor 11 as shown in FIG. 1.

Therefore, the analog Y/U/V signals for the Y/C processor 7 for the main picture I (hereinafter, picture I) selected by the AV switcher 5 in FIG. 1 are supplied to the ADC 16 and the analog Y/U/V signals from the Y/C processor 8 for the sub-picture II (hereinafter, picture II) selected by the AV switcher 5 in FIG. 1 are supplied to the ADC 24. In this embodiment, each of the ADCs 16 and 24 operates with the clock signals of 6.75 MHz for example to generate the digital Y/U/V signals, respectively, in the same manner as in 100 Hz flickerless picture mode described above, though as an alternative, 8 MHz for example or other clock frequency may be chosen in accordance with system requirements. Therefore, the analog Y/U/V signals for each effective line scan duration of 52 µs or more are digitized into around 352 or more words in case of the clock signal of 6.75 MHz. The number of words are selected preferably as a multiple of four, for example 360 words. The clock signals for the ADCs 16 and 24 are synchronized with the horizontal and vertical synchronizing signals of the composite video signal for the picture I and the picture II, respectively.

Figure 4A:
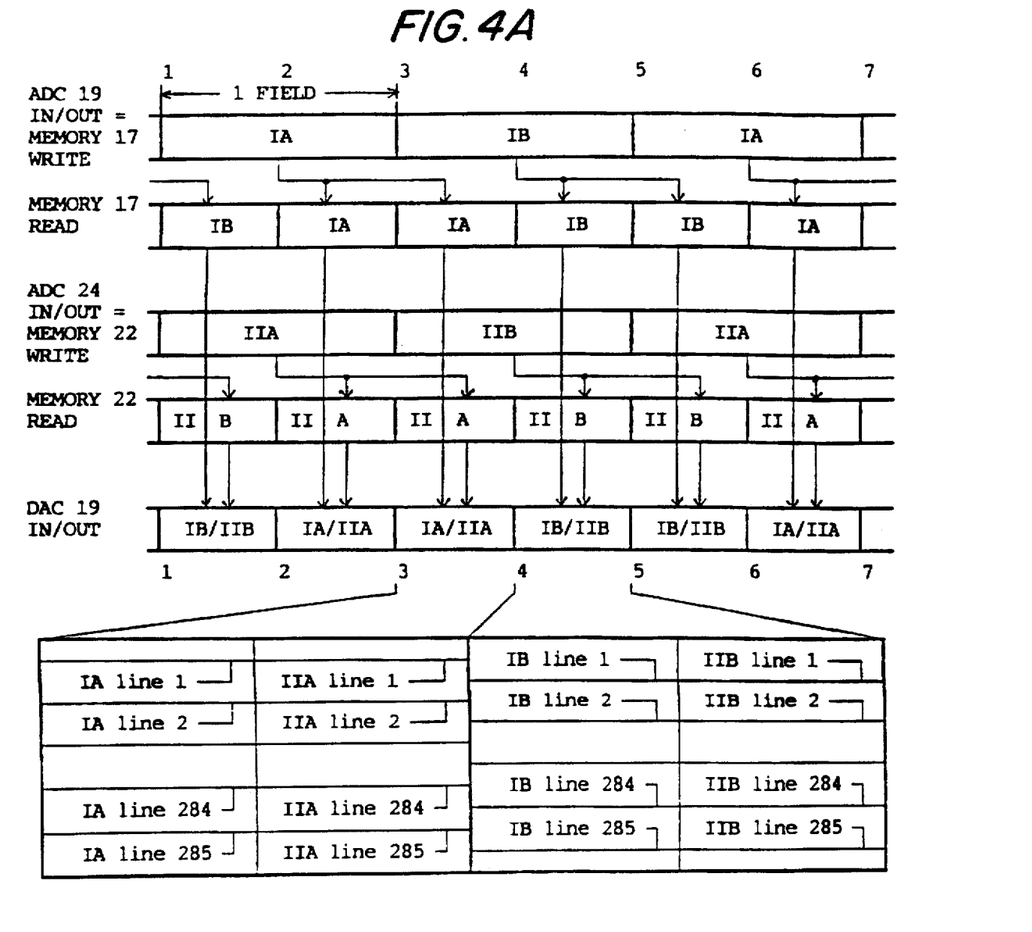
FIGS. 4A and 4B are timing charts of examples of memory control in double picture mode of the signal processor shown in FIG. 2.

As shown in FIG. 4A, the digital Y/U/V signals of each odd field IA and each even field IB for the picture I from the ADC 16 are then written into the field memory 17, alternately, for 20 ms. At the same time, the digital Y/U/V signals of each odd field IIA and each even field IIB for the picture II from the ADC 16 are, through the switch circuit S3, if provided, written into the field memory 22, alternately, for 20 ms. The write clock signals for the field memories 17 and 22 are also synchronized with the horizontal and vertical synchronizing signals of the composite video signal for the picture I and the picture II, respectively.

The digital Y/U/V signals of each field IA and IB stored in the field memory 17 and the digital Y/U/V signals of each field IIA or IIB stored in the field memory 22 are then read out simultaneously, as shown in FIG. 4A, according to the read clock signals having a predetermined frequency which has a certain relationship with the clock frequency of the write clock signals thereof, as explained below. More precisely, the digital Y/U/V signals are read out in such a line-wise manner that the digital Y/U/V signals of each same line of each field of the picture I and each field of the picture II are alternately read out for the line scan duration. The read clock signals for the field memories 17 and 22 are synchronized with the horizontal and vertical synchronizing signals of the composite video signal for either the picture I or the picture II, in this case, the picture I.

The digital Y/U/V signals read out from the field memories 17 and 22 are then supplied through the noise reduction circuit 18 and the switch circuit S2 to the DAC 19. In this case, the switch circuit S2 may be provided between the field memories 17 and 22 and the noise reduction circuit 18 instead of the location between the noise reduction circuit 18 and the DAC 19 as shown in FIG. 2. The DAC 19 then converts the digital Y/U/V signals into the analog Y/U/V signals in a reverse manner to the analog to digital conversion of the ADCs 16 and 24 with the clock signal of the same predetermined frequency as the read clock signals for the field memories 17 and 22. The analog Y/U/V signals are then converted into R/G/B signals which are supplied to the display apparatus 10 to display two pictures on the screen.

To display two pictures in 100 Hz flickerless picture mode, especially in the A, A, B and B sequence as described above, the digital Y/U/V signals of each odd field IA of the picture I and each odd field IIA of the picture II are read out from the field memories 17 and 22 twice for each 20 ms, respectively, in the above described manner so that the digital Y/U/V signals of each line are read out for each 13 µs. While the digital Y/U/V signals of each odd field IA and each odd field IIA are read out from the field memories 17 and 22 for the second time, simultaneously the digital Y/U/V signals of each even field IB and each even field IIB from the ADCs 16 and 24 are written into the field memories 17 and 22 for each 20 ms, respectively. The digital Y/U/V signals of each even field IB and each even field IIB are then read out from the field memories 17 and 22 twice for each 20 ms, respectively, in the same manner as described above. This sequence is repeated every 20 ms. The digital Y/U/V signals from the the field memories 17 and 22 are supplied to the DAC 19. The analog Y/U/V signals from the DAC 19 are finally converted into R/G/B signals which are supplied to the display apparatus 10. The display apparatus 10 scans horizontally each line at the line scan speed of 32 µs/line among which the effective line scan duration corresponding to the Y/U/V signals from the DAC 19 is 26 µs, the line frequency of 31.25 KHz and vertically each odd field twice for 20 ms and each even field twice for 20 ms at the field frequency of 100 Hz on its screen.

Television receivers with the screen having a wide aspect ratio of 16:9 are becoming very popular now. If the television signal represents a picture having an aspect ration of 16:9 in a letter box format, the picture can be displayed in the full size of a wide aspect screen of such a television, for example, by zooming. If the television signal is transmitted by the PAL-plus system which has been introduced recently, the picture can be displayed in the full size of the wide screen of a PAL-plus dedicated television receiver by scanning the full effective 575 lines.

Figure 5A:
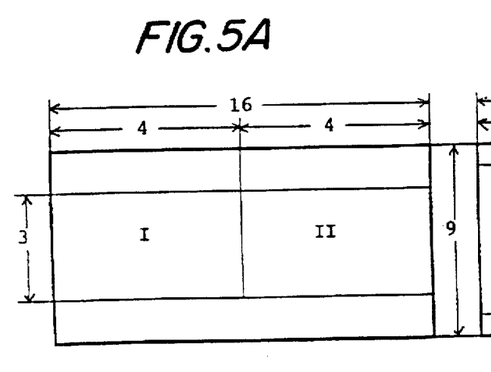
FIGS. 5A and 5B are schematic diagrams showing examples of display in double picture mode of the television receiver according to the invention.
Figure 5B:
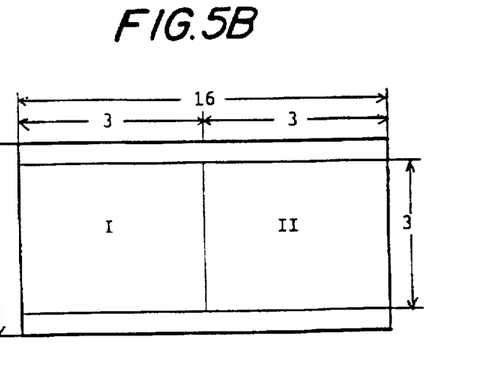

FIGS. 5A and 5B shows two examples using such a wide screen having an aspect ratio 16:9 for displaying two pictures. If two pictures I and II of the aspect ratio of 4:3 are simultaneously displayed in the correct picture geometry as shown in FIG. 5A, the clock frequency of the read clock signals for the field memories 17 and 22 and the clock signal for the DAC 19 is 27 MHz for example which is four times of 6.25 MHz and the picture height is compressed to ⅔ by adjusting the vertical deflection of the display apparatus 10, for example. If each picture should be displayed in a larger size but in the correct picture geometry, it can be realized by cutting each picture at both left and right sides, decreasing the clock frequency of the read clock signals for the field memories 17 and 22 and the clock signal for the DAC 19 or increasing the clock frequency of the clock signal for the ADCs 16 and 24 and the write clock signals for the field memories 17 and 22 as much as each line length is shortened, and adjusting the vertical deflection of the display apparatus 10.

For example, if two pictures I and II are simultaneously displayed in an aspect ratio of 3:3, respectively, as shown in FIG. 5B, each picture is cut by ⅛ at each side by not reading out the corresponding digital Y/U/V signals from the field memories 17 and 22. Accordingly, the clock frequency of the read clock signals for the field memories 17 and 22 and the clock signal for the DAC 19 may be selected 27 MHz which is less than four times of the frequency 8 MHz of the clock signals for the ADCs 16 and 24 and the write clock signals for the field memories 17 and 22, and the picture height is compressed to ⅚ by adjusting the vertical deflection of the display apparatus 10. Other arbitrary aspect ratios can be realized in similar manners.

If the composite video signal for the picture I is missing, the horizontal and vertical synchronizing signals for synchronization of the read clock signal are also missing. In such a case, the horizontal and vertical synchronizing signals for the picture II is used by switching in the timing generator 20 and the micro processor 21 or by exchanging the composite video signals for the picture I and the picture II in the AV switcher 5 in FIG. 1.

Figure 4B:
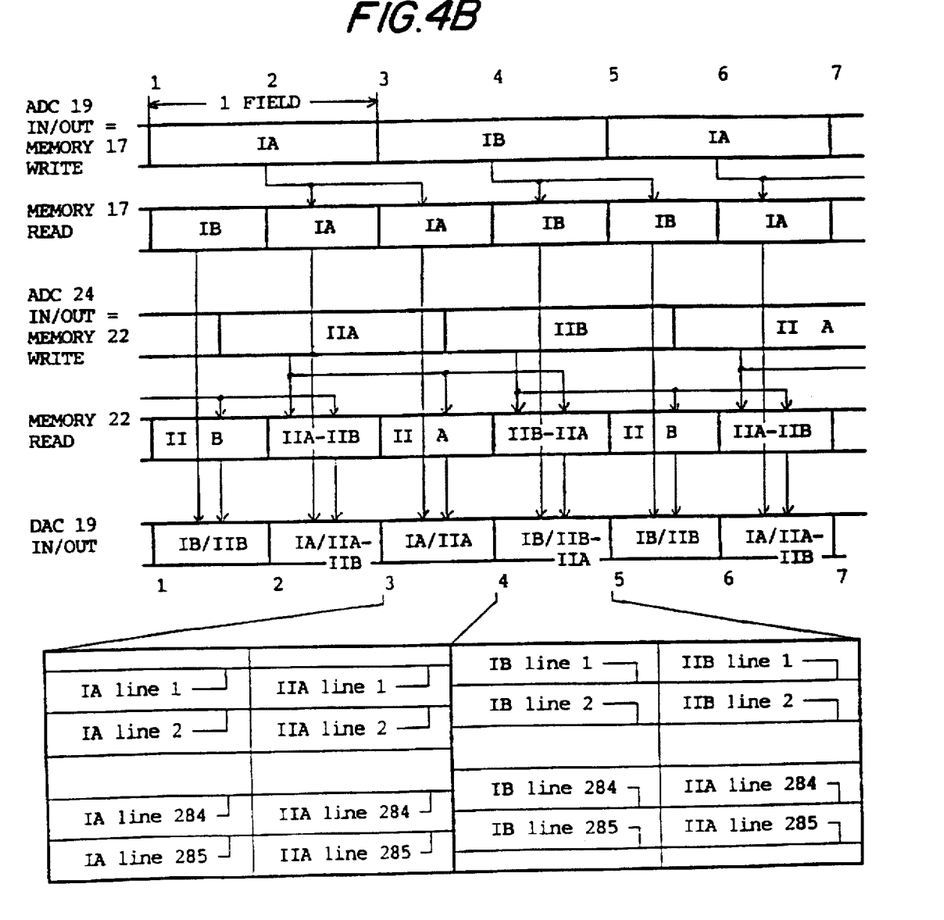

In the above described embodiment, the digital Y/U/V signals of each previous field of the pictures I and II in the field memory 17 and 22 are overwritten by the digital Y/U/V signals of each current field of the pictures I and II, respectively. If two composite video signals are not synchronized with each other in practice, the write timings of two sets of digital Y/U/V signals into the field memories 17 and 22 do not coincide with each other. If the digital Y/U/V signals of the picture II are read out from the field memory 22 earlier than the digital Y/U/V signals of each previous field of the picture II stored in the field memory 22 are over-written by the digital Y/U/V signals of each current field of the picture II more than the half field, the digital Y/U/V signals of two different fields IIA and IIB of the picture II are read out in same field, as shown in FIG. 4B. As a result, the interlace relationship in the picture II becomes incorrect and vertical resolution of the picture II is deteriorated.

In order to solve this problem, a two port field memory which has a random block addressing mode is used for at least one of the field memories 17 or 22. In this embodiment, the field memory 17 is assigned as the master and the field memory 22 is assigned as a slave and the field memory 22 is constructed by a two port field memory which has the random block addressing mode. In the random block addressing mode, before starting the write and/or read operations, the initial values of the write and/or read address pointers can be designated in a block wise, for example, any one of 3072 blocks each including several words, for example, 80 words, so that the storage cells can be divided into one or more areas for different data. The random block addressing mode for the write address pointer and/or the read address pointer can be selected by providing special codes through the input enable and write enable terminals and/or the output enable and read enable terminals while the reset write signal and/or the read reset signal are effective, respectively. A start block can be then set by providing the data input terminal with a corresponding block address of 12 bits.

Figure 6A:
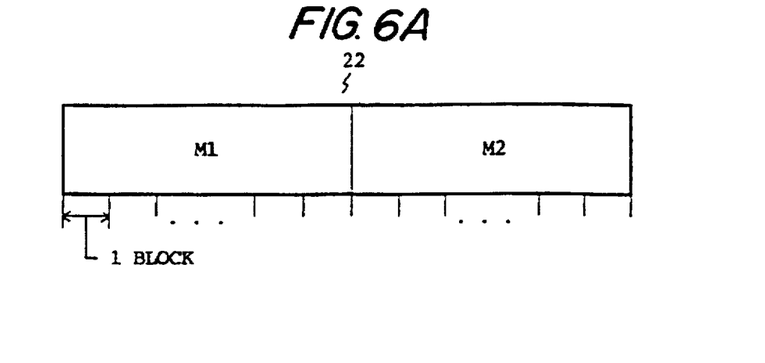
FIG. 6A is a schematic diagram showing a two port field memory having random block access mode which may be used in the signal processor in FIG. 2.

In this embodiment, since the data rate of the each digital Y/U/V signals of the pictures I and II in the double picture mode is approximately half of that in the normal 100 Hz flickerless picture mode, one field memory can be used for storing the digital Y/U/V signals of two fields. Therefore, the digital Y/U/V signals of each odd field IIA of the picture II are written into the first area M1 of the field memory 22 designated by the block address corresponding to the first block of the area M1 and the digital Y/U/V signals of each even field IIB of the picture II are written into the second area M2 of the field memory 22 designated by the block address corresponding to the first block of the area M2, separately as shown in FIG. 6A, without erasing the digital Y/U/V signals of each previous even field IIB and each previous odd field IIA, respectively.

Figure 6B:
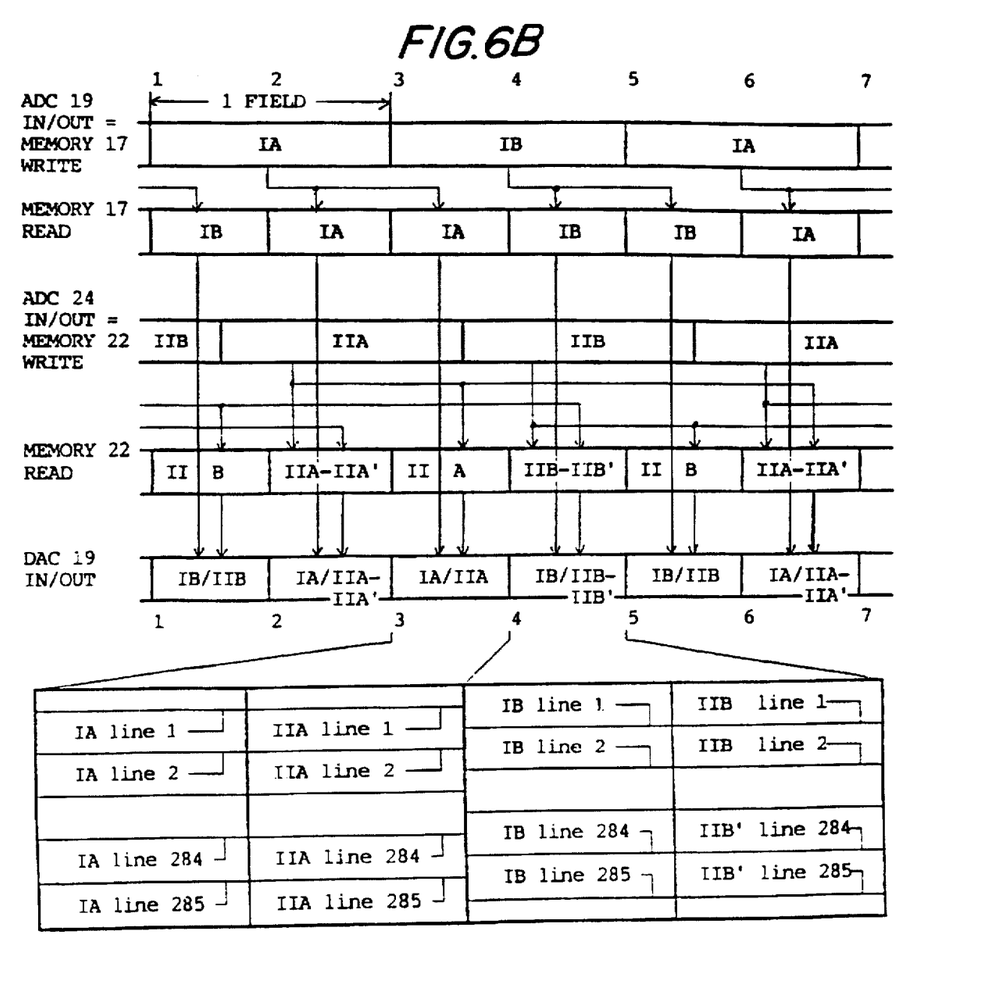
FIG. 6B is a timing chart of a further example of memory control in double picture mode of the signal processor shown in FIG. 2.

Accordingly, the digital Y/U/V signals of only odd field IIA of the picture II are read out from the first area M1 of the field memory 22 without mixed with the digital Y/U/V signals of even field IIB of the picture II and the digital Y/U/V signals of only even field IIB of the picture II are read out from the second area M2 of the field memory 22 without mixed with the digital Y/U/V signals of odd field IIB of the picture II, as shown in FIG. 6B, regardless of the read timing of the field memory 22, so that the above mentioned problem in the interlace relationship can be solved.

However, even in this solution, there is still another remaining problem. The digital Y/U/V signals of each previous odd field IIA' of the picture II in the memory areas M1 of the field memory 22 will be overwritten by the digital Y/U/V signals of each current odd field IIA of the picture II and the digital Y/U/V signals of each previous even field IIB' of the picture II in the memory areas M2 of the field memory 22 will be overwritten by the digital Y/U/V signals of each current even field IIB of the picture II. If the digital Y/U/V signals of the picture II are read out from the field memory 22 earlier than the digital Y/U/V signals of each previous odd and even fields IIA' and IIB' of the picture II stored in the field memory 22 are overwritten by the digital Y/U/V signals of each current odd and even fields IIA and IIB of the picture II more than the half field, the digital Y/U/V signals of each previous and current odd fields IIA' and IIA or each previous and current even fields IIB' and IIB of the picture II are read out in same field, as shown in FIG. 6B. If the picture II is not a still picture but a relatively fast motion picture, two picture parts in different timings are displayed as one picture in the upper and lower parts on the screen, respectively, as shown in FIG. 6B, though here is no problem in the interlace relationship as mentioned above.

In order to solve this problem, a two port field memory having a random block addressing mode is used for each of the field memories 17 and 22 so that the digital Y/U/V signals of each odd field IA and each even field IB of the picture I are written into the first area M1 and the second area M2 of the field memory 17, respectively, in the same manner as explained in the above example of the field memory 22.

Figure 7A:
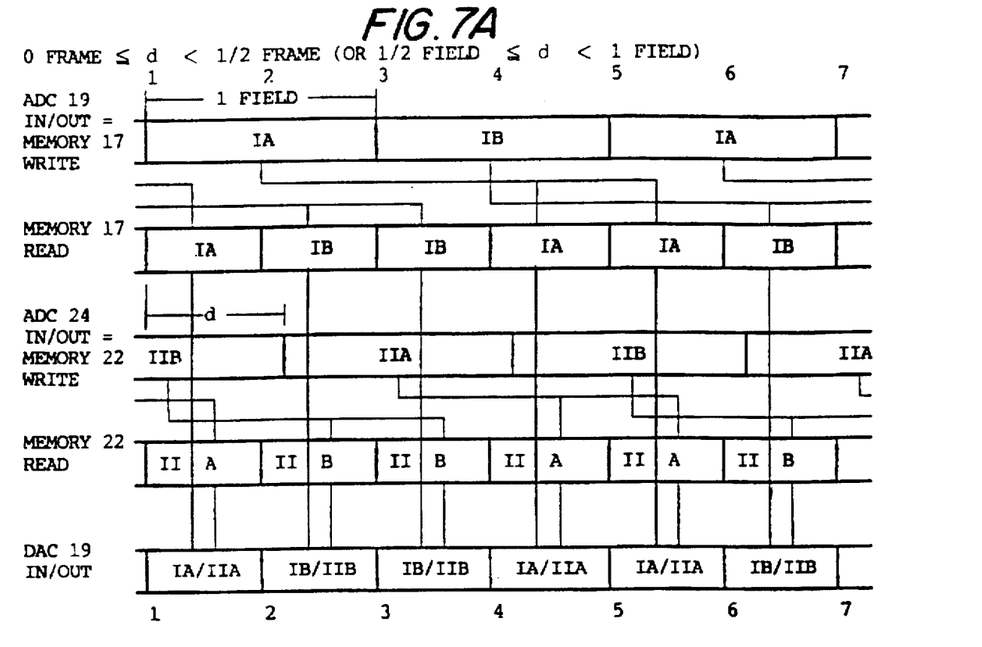
FIGS. 7A, 7B, 7C and 7D are timing charts of further examples of memory control in double picture mode of the signal processor shown in FIG. 2.

In this embodiment, the field memory 17 is assigned as the master and the field memory 22 is assigned as a slave. In case that the signal phase d between the Y/U/V signals of the two pictures I and II are not larger than ½ frame or 20 ms, while the digital Y/U/V signals of each current odd field IA of the picture I are written into the area M1 of the field memory 17 for each 20 ms, the digital Y/U/V signals of each previous odd and even fields IA and IB of the picture I are sequentially read out from the areas M1 and M2 of the field memory 17 for 20 ms, and while the digital Y/U/V signals of each current even field IB of the picture I are written into the area M2 of the field memory 17 for each 20 ms, the digital Y/U/V signals of each previous even and odd fields IB and IA of the picture I are sequentially read out from the areas M2 and M1 of the field memory 17 for 20 ms. The digital Y/U/V signals of each field IIA or IIB of the picture II are read out from each area M1 or M2 of the field memory 22 twice for each 20 ms in same field phase as to read out the digital Y/U/V signals of the picture I as shown in FIG. 7A.

Figure 7B:
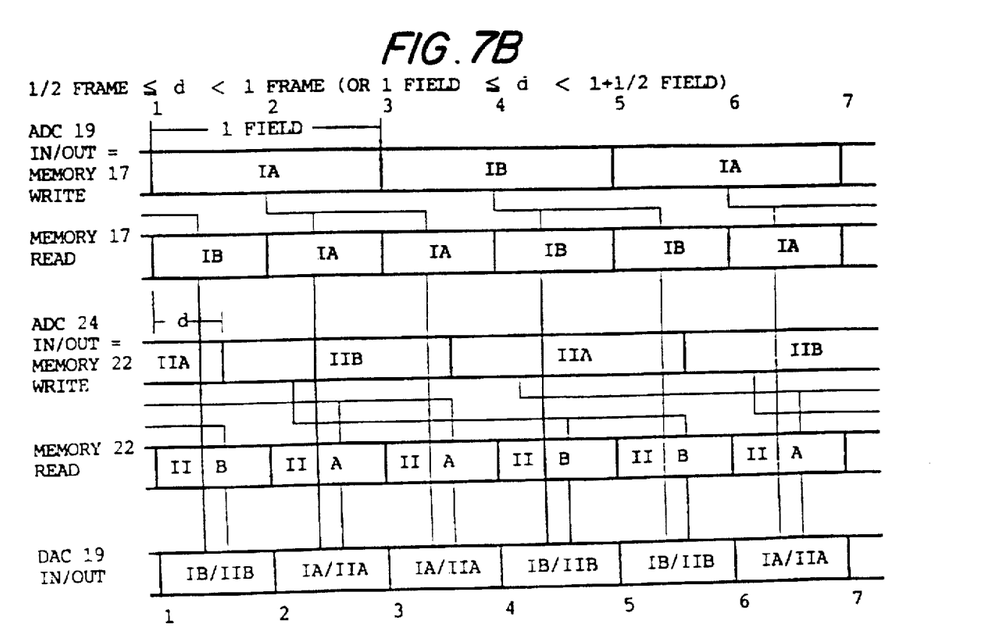

In case that the signal phase d between the Y/U/V signals of the two pictures I and II are larger than ½ frame or 20 ms, if the above read out timing is maintained, the same problem as shown in FIG. 6B will happen. Therefore, in this case, while the digital Y/U/V signals of each current odd field IA of the picture I are written into the area M1 of the field memory 17 for each 20 ms, the digital Y/U/V signals of each previous even and odd fields IB and IA of the picture I are sequentially read out from the areas M2 and M1 of the field memory 17 for 20 ms, and while the digital Y/U/V signals of each current even field IB of the picture I are written into the area M2 of the field memory 17 for each 20 ms, the digital Y/U/V signals of each previous odd and even fields IA and IB of the picture I are sequentially read out from the areas M1 and M2 of the field memory 17 for 20 ms. The digital Y/U/V signals of each field IIA or IIB of the picture II are read out from each area M1 and M2 of the field memory 22 twice for each 20 ms in same field phase as to read out the digital Y/U/V signals of the picture I as shown in FIG. 7B.

Figure 7C:
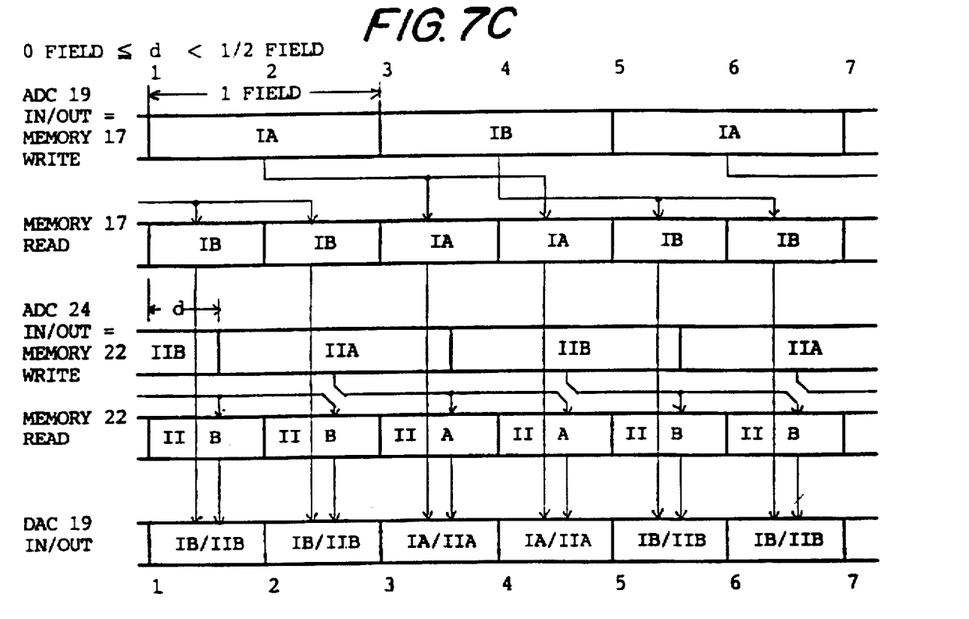
Figure 7D:
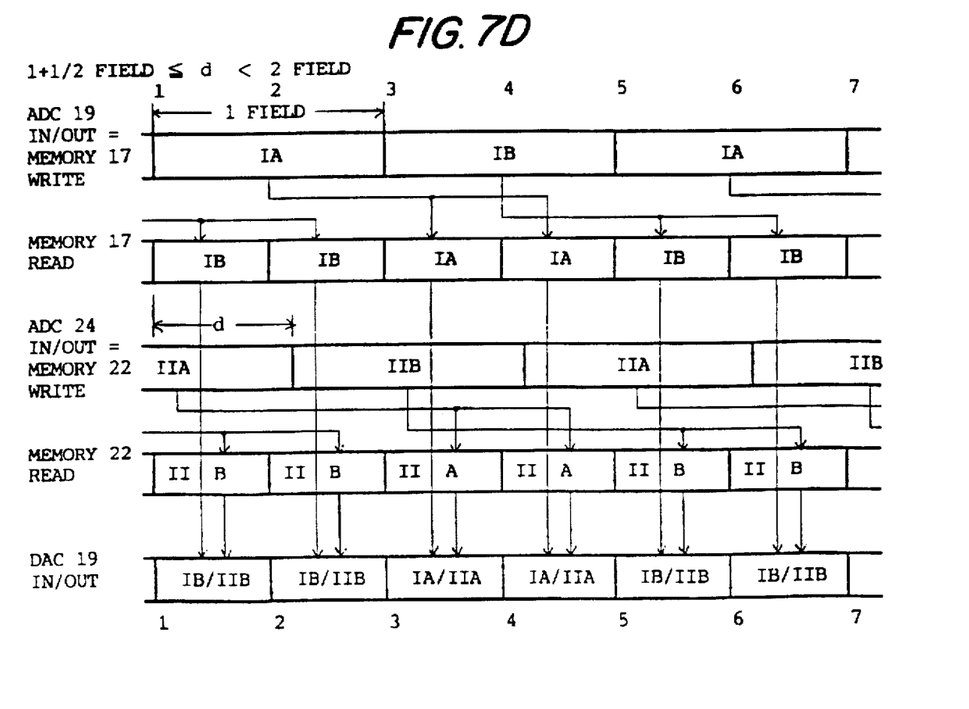

The signal phase_d can be detected in the timing generator 20 or the micro processor 21 to control the above read out timing. It is possible to change the read out timing in response to whether the signal phase_d is between 0 and ½ field or 10 ms (FIG. 7C), between ½ field or 10 ms and 1 field or 20 ms (FIG. 7A), between 1 field or 20 ms and 1+½ field or 30 ms (FIG. 7B), or between 1+½ field or 30 ms and 2 field or 40 ms (FIG. 7D). If some deterioration in picture quality is acceptable, other read out timings than the above can be also applied.

Although the field memory 17 is assigned as the master and the field memory 22 is assigned as a slave with respect to the read out timing in the above embodiments, both of the field memories 17 and 22 can be assigned as slaves which are read out by read control signals independent from the write control signals of the field memories 17 and 22.

In the above, the double picture display in 100 Hz flickerless picture mode of the A, A, B and B sequence was explained. However, the double picture display in the A, B, A and B sequence or A, A*, B*, and B sequence can be also realized by modifying the read out timing and/or sequence of the Y/U/V signals from the field memories 17 and/or 22 or by changing the memory type into frame memory, for example, if available.

While the video signals for the pictures I and II are handled in a form of digital Y/U/V signals, it is possible to handle the video signals in form of analog Y/U/V signals, analog or digital R/G/B signals or other form of video signals.

This invention can be applied not only to a television receiver with a wide aspect ratio but also to a television receiver with a normal aspect ratio such as 4:3. This invention can be also applied to a television receiver of normal PAL system having the field frequency of 50 Hz or to a television receiver of NTSC system having the field frequency of 60 Hz in a normal mode or 120 Hz in a flickerless mode. This invention can be further applied to a video monitor without tuner but with several video signal input terminals.

I claim:

1. A method for displaying video pictures of a first and a second received video signal comprising the steps of:
   storing the first received video signal in a first memory at a first predetermined frequency in synchronism with a synchronizing signal of the first received video signal;
   storing the second received video signal in a second memory at said first predetermined frequency in synchronism with a synchronizing signal of the second received video signal;
   reading out the first and second received video signals alternately linewise from the first and second memories at a second predetermined frequency in synchronism with the synchronizing signal of either the first received video signal or the second received video signal; and
   displaying the video pictures corresponding to the first and second received video signals on a video screen.

2. A video display apparatus comprising:
   video signal input terminal means for receiving first and second video signals;
   first memory means for storing the first video signal;
   second memory means for storing the second video signal;
   write and read control signal generating means for generating;
   a first write control signal controlling the first memory means so that the first video signal is written into said first memory means at a first predetermined frequency in synchronism with a synchronizing signal of the first video signal;
   a second write control signal controlling the second memory means so that the second video signal is written into said second memory means at the first predetermined frequency in synchronism with a synchronizing signal of the second video signal; and
   read clock signals controlling said first and second memory means so that the first and second video signals are alternatively linewise read out from said first and second memory means at a second predetermined frequency in synchronism with the synchronizing signal of either the first video signal or the second video signal; and
   display means provided with the first and second video signals read out from said first and second memory means for displaying two pictures corresponding to the first and second video signals on a screen thereof.

3. The video display apparatus according to claim 2, further comprising:
   Y/C processor means connected to said video signal input terminal means for converting the first and second video signals into first and second analog Y/U/V signals;
   analog to digital converter means connected between said Y/C processor means and said first and second memory means for converting the first and second analog Y/U/V signals into first and second digital Y/U/V signals; and
   digital to analog converter means connected to an output of said first and second memory means for converting the first and second digital Y/U/V signals read out from said first and second memory means into analog Y/U/V signals.

4. The video display apparatus according to claim 2, wherein said first and second memory means are respective first and second field memory means.

5. The video display apparatus according to claim 4, wherein said first and second field memory means are constructed as two port field memories.

6. The video display apparatus according to claim 5, wherein at least one of said two port field memories has a random block addressing mode.

7. The video display apparatus according to claim 2, wherein the second predetermined frequency is four times the first predetermined frequency.

8. The video display apparatus according to claim 2, wherein the first and second video signals are PAL video signals each having a field frequency of 50 Hz and the two pictures corresponding to the first and second video signals are displayed on said screen at a field frequency of 100 Hz.

9. The video display apparatus according to claim 2, wherein said screen has a wide aspect ratio of 16:9.

10. The video display apparatus according to claim 9, wherein the two pictures are displayed on the screen in an aspect ratio of 4:3, respectively.

11. The video display apparatus according to claim 9, wherein the two pictures are displayed on the screen in an aspect ratio of 3:3, respectively.

* * * * *